United States Patent
Fujishiro

(10) Patent No.: US 9,781,587 B2
(45) Date of Patent: Oct. 3, 2017

(54) BASE STATION, USER TERMINAL, AND PROCESSOR

(71) Applicant: KYOCERA CORPORATION, Kyoto (JP)

(72) Inventor: Masato Fujishiro, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/176,552

(22) Filed: Jun. 8, 2016

(65) Prior Publication Data

US 2016/0286375 A1    Sep. 29, 2016

Related U.S. Application Data

(63) Continuation of application No. 14/633,993, filed on Feb. 27, 2015, which is a continuation of application No. PCT/JP2013/072608, filed on Aug. 23, 2013.

(60) Provisional application No. 61/694,052, filed on Aug. 28, 2012.

(51) Int. Cl.
    H04W 8/00      (2009.01)
    H04W 76/04     (2009.01)
    H04W 52/30     (2009.01)
    H04W 76/02     (2009.01)
    H04W 52/38     (2009.01)
    H04W 40/24     (2009.01)

(52) U.S. Cl.
    CPC ......... *H04W 8/005* (2013.01); *H04W 40/246* (2013.01); *H04W 52/30* (2013.01); *H04W 52/383* (2013.01); *H04W 76/023* (2013.01); *H04W 76/046* (2013.01)

(58) Field of Classification Search
    CPC .................................................. H04W 8/00
    See application file for complete search history.

(56) References Cited

U.S. PATENT DOCUMENTS

| | | | |
|---|---|---|---|
| 7,336,638 B2 | 2/2008 | Cheng et al. | |
| 2006/0258383 A1 | 11/2006 | Jiang et al. | |
| 2012/0213109 A1* | 8/2012 | Xu | H04B 7/024 370/252 |
| 2012/0250531 A1* | 10/2012 | Patil | H04W 8/005 370/252 |

(Continued)

FOREIGN PATENT DOCUMENTS

| | | |
|---|---|---|
| JP | 2007-501582 A | 1/2007 |
| JP | 2008-510344 A | 4/2008 |

(Continued)

OTHER PUBLICATIONS

Motorola (RWS-120007) 3GPP RAN rel-12 & beyond.*

(Continued)

*Primary Examiner* — Andrew Chriss
*Assistant Examiner* — Voster Preval
(74) *Attorney, Agent, or Firm* — Studebaker & Brackett PC

(57) ABSTRACT

A base station, which accommodates a user terminal that transmits a discovery-use signal used for discovering a communication partner terminal in D2D communication that is direct device-to-device radio communication in a mobile communication system that supports the D2D communication, comprises a control unit that controls transmission of power control information for designating transmission power of the discovery-use signal to the user terminal.

8 Claims, 11 Drawing Sheets

(56) References Cited

U.S. PATENT DOCUMENTS

| | | | | |
|---|---|---|---|---|
| 2014/0003262 A1* | 1/2014 | He | ................ | H04W 28/08 |
| | | | | 370/252 |
| 2014/0024378 A1* | 1/2014 | Khude | ................ | H04W 8/06 |
| | | | | 455/437 |
| 2014/0349702 A1* | 11/2014 | Sfar | ................ | H04W 52/343 |
| | | | | 455/522 |
| 2015/0124737 A1* | 5/2015 | Lee | ................ | H04W 52/28 |
| | | | | 370/329 |
| 2015/0208225 A1* | 7/2015 | Yu | ................ | H04W 4/008 |
| | | | | 370/329 |

FOREIGN PATENT DOCUMENTS

| | | |
|---|---|---|
| WO | 2010/078271 A2 | 7/2010 |
| WO | 2011/130623 A2 | 10/2011 |
| WO | 2012/145724 A1 | 10/2012 |
| WO | 2013/170908 A1 | 11/2013 |
| WO | 2014/031829 A2 | 2/2014 |

OTHER PUBLICATIONS

International Search Report; PCT/JP2013/072608; dated Oct. 29, 2013.
3GPP TR 22.803 V0.3.0 (May 2012); 3rd Generation Partnership Project; Technical Specification Group SA; Feasibility Study for Proximity Services (ProSe)(Release 12).
The extended European search report issued by the European Patent Office dated Mar. 23, 2016, which corresponds to European Patent Application No. 13832866.1-1855 and is related to U.S. Appl. No. 14/633,993.

\* cited by examiner

FIG. 8
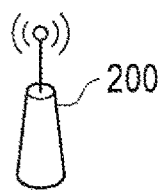

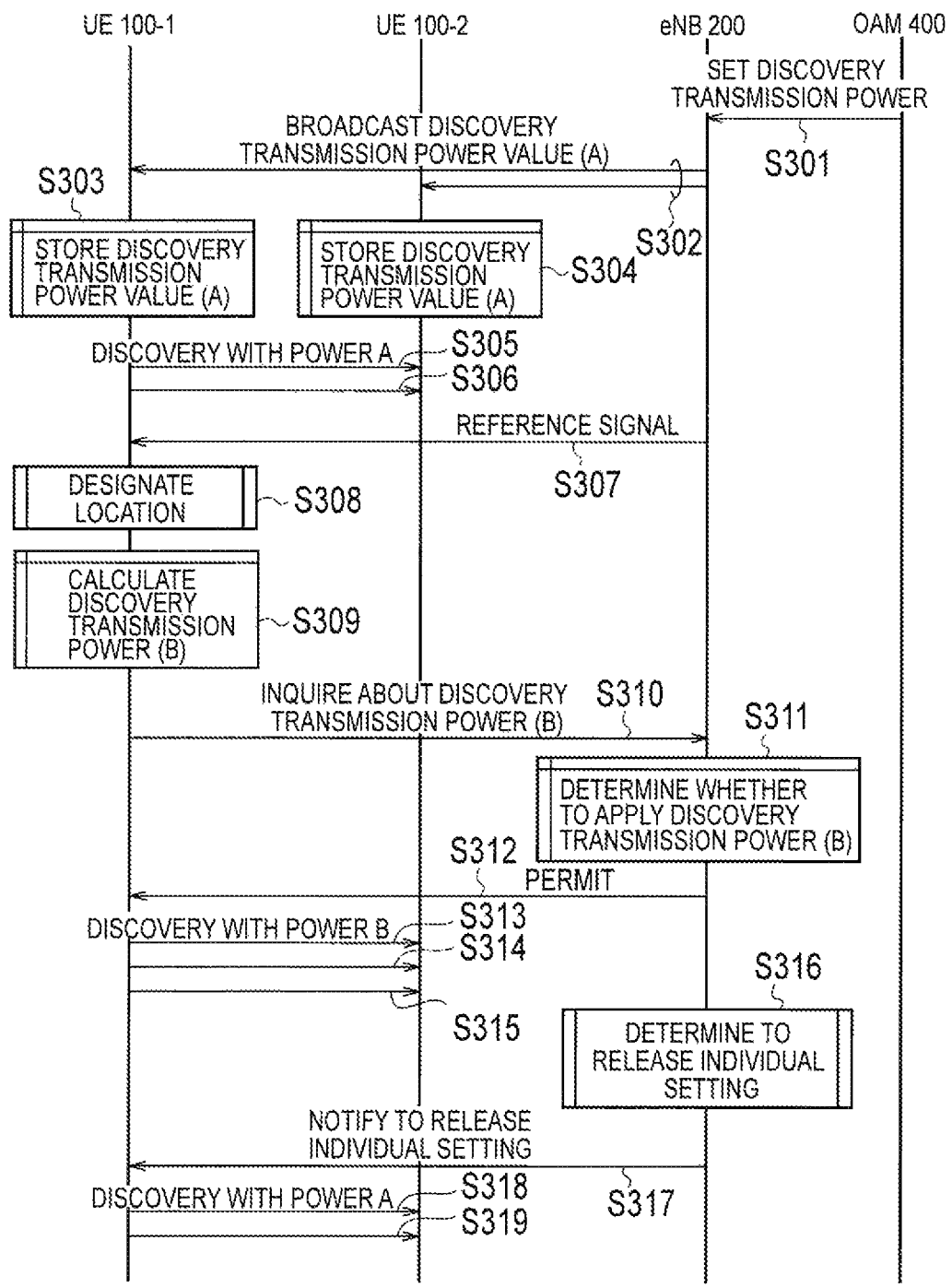

BASE STATION, USER TERMINAL, AND PROCESSOR

TECHNICAL FIELD

The present invention relates to a base station, a user terminal, and a processor in a mobile communication system that supports D2D communication.

BACKGROUND ART

In 3GPP (3rd Generation Partnership Project) which is a project aiming to standardize a mobile communication system, the introduction of Device to Device (D2D) communication is discussed as a new function after Release 12 (see Non-Patent Document 1).

In the D2D communication, a plurality of user terminals adjacent to one another perform direct radio communication in a frequency band assigned to a mobile communication system. It is noted that the D2D communication is also called Proximity Service communication.

PRIOR ART DOCUMENT

Non-Patent Document

Non-Patent Document 1: 3GPP technical report "TR 22.803 V0.3.0" May 2012

SUMMARY OF THE INVENTION

The current specifications have a problem in that there is no mechanism for appropriately controlling the D2D communication.

Therefore, the present invention provides abase station, a user terminal, and a processor capable of appropriately controlling D2D communication.

According to an embodiment, a base station, which accommodates a user terminal that transmits a discovery-use signal used for discovering a communication partner terminal in D2D communication that is direct device-to-device radio communication in a mobile communication system that supports the D2D communication, comprises: a control unit that controls transmission of power control information for designating transmission power of the discovery-use signal to the user terminal.

According to an embodiment, a user terminal that transmits a discovery-use signal used for discovering a communication partner terminal in D2D communication that is direct device-to-device radio communication in a mobile communication system that supports the D2D communication, comprises: a control unit that determines transmission power of the discovery-use signal, and controls transmission of inquiry information for inquiring whether to apply the determined transmission power to a base station.

According to an embodiment, a processor provided in a user terminal that transmits a discovery-use signal used for discovering a communication partner terminal in D2D communication that is direct device-to-device radio communication in a mobile communication system that supports the D2D communication, performs a process of determining transmission power of the discovery-use signal, and transmitting inquiry information for inquiring whether to apply the determined transmission power to a base station.

BRIEF DESCRIPTION OF THE DRAWINGS

FIG. 8 is a diagram for explaining a Discovery signal.
FIG. 16 is a sequence diagram of an operation pattern according to another embodiment.

DESCRIPTION OF THE EMBODIMENT

Overview of Embodiment

Figure 1:
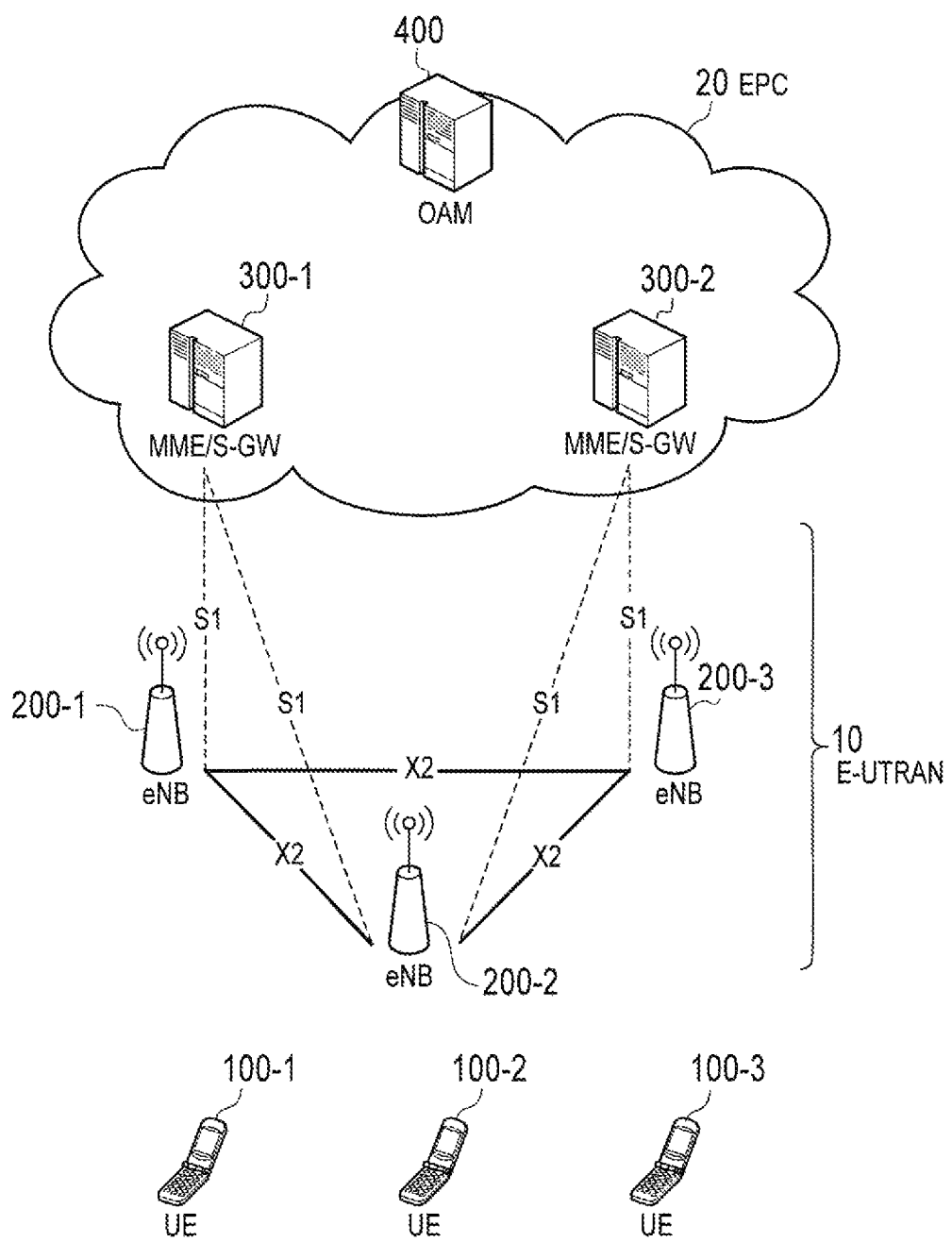
FIG. 1 is a configuration diagram of an LTE system.

A base station according to a first embodiment accommodates a user terminal, which transmits a discovery-use signal used for discovering a communication partner terminal in D2D communication that is direct device-to-device radio communication, in a mobile communication system that supports the D2D communication. Here, the "discovery of the communication partner terminal" includes that the user terminal is discovered by the communication partner terminal (Discoverable) as well as that the user terminal discovers the communication partner terminal (Discover). Furthermore, the "accommodating the user terminal" includes a state in which a user terminal in an idle state selects a base station as well as a state in which the user terminal establishes a connection with the base station.

In the first embodiment, the base station includes a control unit that controls transmission of power control information for designating the transmission power of the discovery-use signal to the user terminal. Thereby, a base station is able to designate the transmission power of a discovery-use signal in a user terminal, so that the user terminal is able to transmit the discovery-use signal with appropriate transmission power. Therefore, it is possible to appropriately control the D2D communication.

In the first embodiment, the power control information includes information indicating: an absolute value of the transmission power and/or an acceptable range of the transmission power. Thereby, since it is sufficient if a user terminal transmits a discovery-use signal with transmission power according to power control information, it is possible to reduce a processing load for determining the transmission power. It is noted that the "acceptable range" may include an upper limit and a lower limit (that is, a relative value) that are determined using the absolute value of the transmission power of a discovery-use signal as a reference, or may include an absolute value of the upper limit and the lower limit.

In the first embodiment, in the case of transmitting the power control information in a broadcast manner, the power control information is set in each cell. Thereby, it is possible to allow the transmission power of a discovery-use signal to be adaptive to characteristics (a frequency band, a size and the like) of a cell. Further, the "case of transmitting the power control information in a broadcast manner", for example, indicates a case in which the power control information is included in system information that is transmitted on a broadcast channel. Furthermore, a base station may acquire information on optimal transmission power of a discovery-use signal in each cell from an upper device.

In the first embodiment, in the case of transmitting the power control information in a unicast manner, the power control information is set in each user terminal, each D2D group, or each location. Thereby, it is possible to finely set the transmission power of a discovery-use signal. Still further, the "case of transmitting the power control information in a unicast manner", for example, indicates a case in which the power control information is included in a control signal (signaling) that is transmitted on an individual channel. In addition, the base station may transmit the power control information to a user terminal in a unicast manner, and then instruct the user terminal to stop (release) the application of the power control information.

In the first embodiment, in the case of transmitting the power control information in a unicast manner, the control unit determines the transmission power of the discovery-use signal in the user terminal on the basis of: the location or capability of the user terminal and/or propagation loss between the base station and the user terminal. Thereby, the transmission power of a discovery-use signal can be made adaptive to the situation of a user terminal. Further, the location or capability of the user terminal, or the propagation loss between the base station and the user terminal, for example, can be determined by the base station on the basis of a signal received from the user terminal. In addition, the capability of the user terminal may include capability for discovering a communication partner terminal in D2D communication, or assignment capability of a radio resource in the D2D communication.

In the first embodiment, in the case of performing handover of the user terminal to another base station, the control unit controls notification of the determined transmission power to the other base station. Thereby, a base station serving as a handover destination is able to take over setting of the transmission power of a discovery-use signal.

Still further, in the first embodiment, both broadcast transmission and unicast transmission of power control information may be used. In this case, a user terminal may apply power control information transmitted in a unicast manner preferentially over power control information transmitted in a broadcast manner. Alternatively, a base station may designate, to a user terminal, as to which one of the information, that is, the power control information transmitted in a broadcast manner and the power control information transmitted in a unicast manner, should be preferentially applied.

A user terminal according to a second embodiment transmits a discovery-use signal, which is used for discovering a communication partner terminal in D2D communication that is direct device-to-device radio communication, in a mobile communication system that supports the D2D communication.

In the second embodiment, the user terminal includes a control unit that determines the transmission power of the discovery-use signal, and then controls transmission of inquiry information for inquiring whether to apply the determined transmission power to a base station. Thereby, a base station is able to manage the transmission power of a discovery-use signal in a user terminal, so that the user terminal is able to transmit a discovery-use signal with appropriate transmission power. Therefore, it is possible to appropriately control the D2D communication.

In the second embodiment, the inquiry information may include information indicating the determined transmission power. Thereby, a base station is able to determine whether the transmission power of a discovery-use signal determined in a user terminal is permissible.

In the second embodiment, the control unit determines the transmission power on the basis of: the location or capability of the user terminal and/or propagation loss between the base station and the user terminal. Thereby, the transmission power of a discovery-use signal can be made adaptive to the situation of a user terminal.

Hereinafter, with reference to the accompanying drawings, the following description will be provided for each embodiment when D2D communication is introduced to a cellular mobile communication system (hereinafter, an "LTE system") configured according to 3GPP standards.

First Embodiment

LTE System

FIG. 1 is a configuration diagram of an LTE system according to the present embodiment.

As illustrated in FIG. 1, the LTE system includes a plurality of UEs (User Equipments) 100, E-UTRAN (Evolved-Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility management Entities)/S-GWs (Serving-Gateways) 300, and OAM (Operation and Maintenance) 400.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
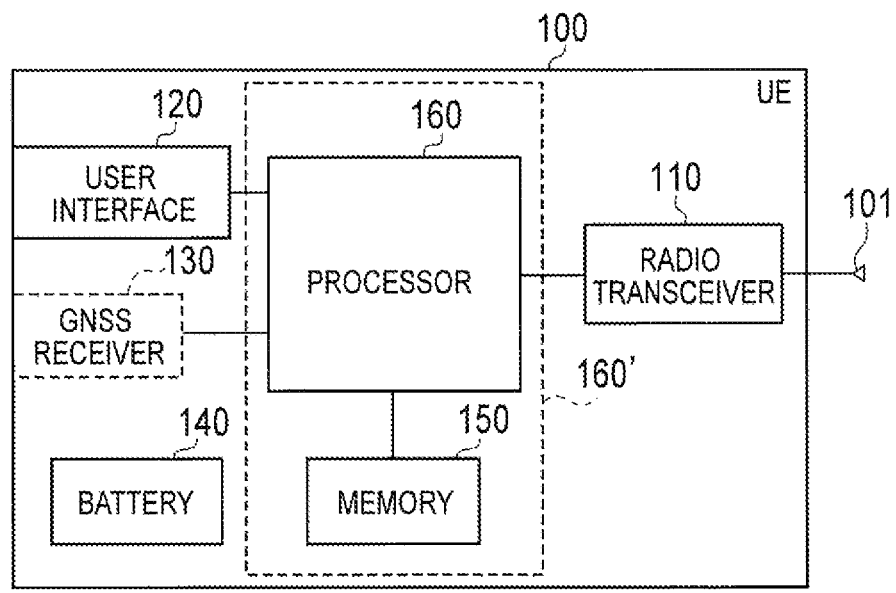
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, coding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
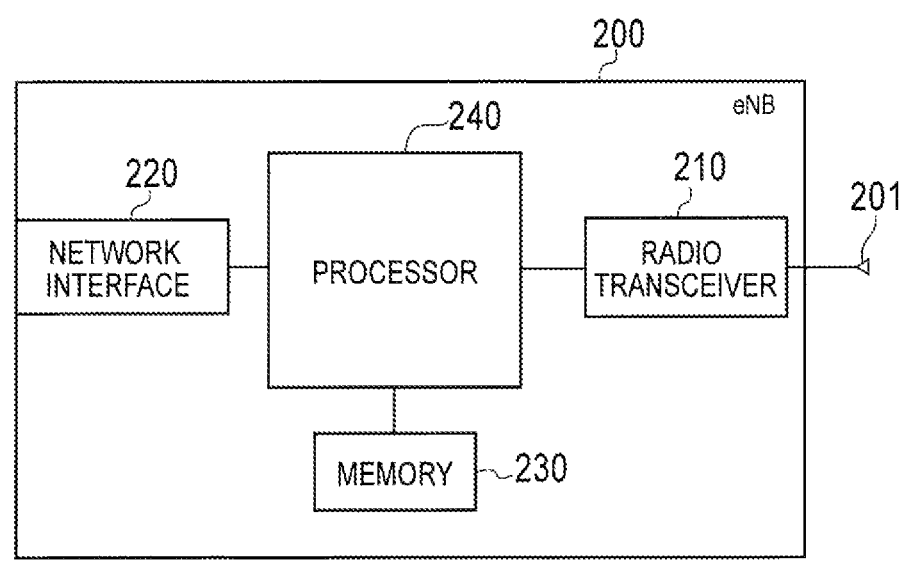
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that perform various processes by executing the program stored in the memory 230. The processor 240 implements various processes and various communication protocols described later. Furthermore, the memory 230 may be integrally formed with the processor 240, and this set (that is, a chipset) may be called a processor.

Figure 4:
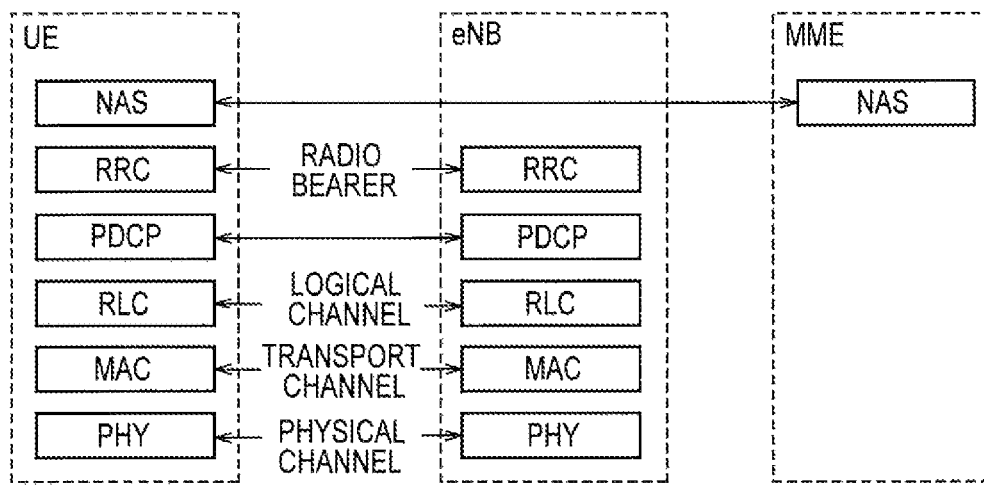
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a transport format of an uplink and a downlink (a transport block size, a modulation and coding scheme, and the like) and a MAC scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

Figure 5:
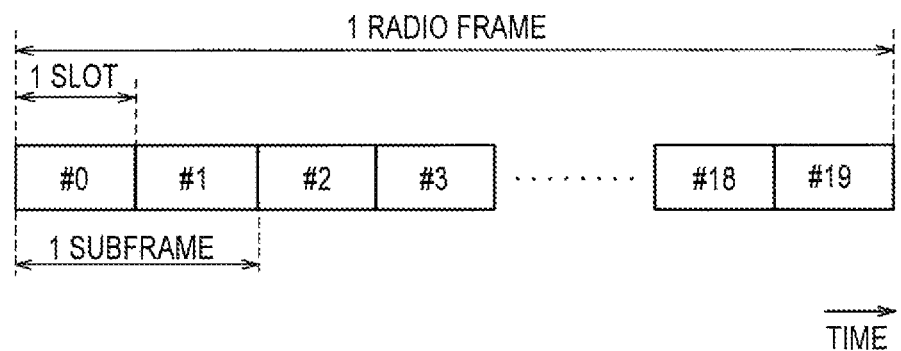
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged. Specifically, the DMRS is arranged at the fourth symbol of each slot in the case of normal CP and is arranged at the third symbol of each slot in the case of expanded CP. The SRS is arranged at the final symbol of a subframe.

(D2D Communication)

Next, description is given by comparing the D2D communication with the normal communication (the cellular communication) in the LTE system.

Figure 6:
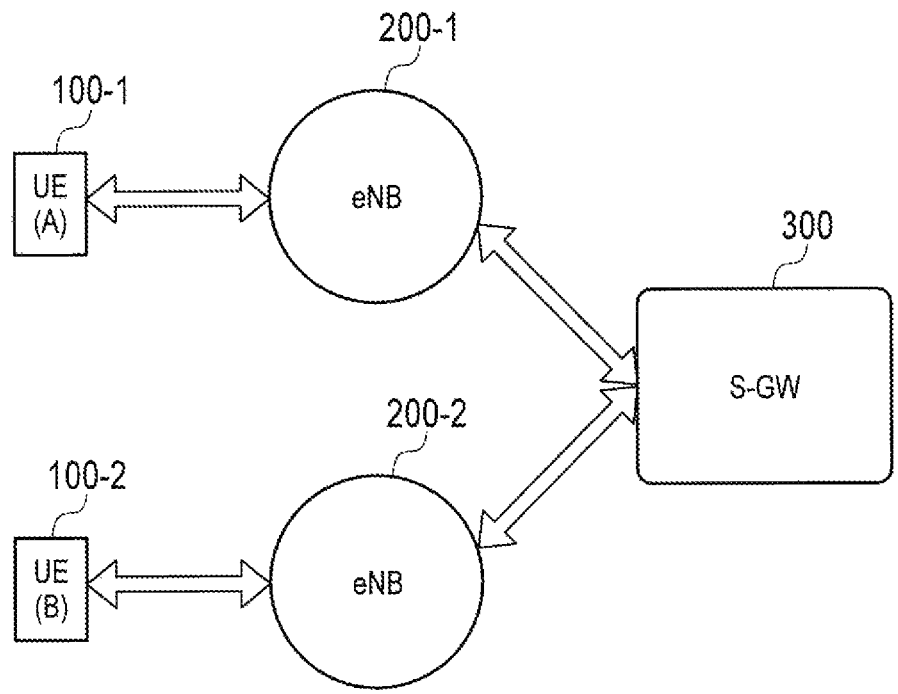
FIG. 6 illustrates a data path in cellular communication.

FIG. 6 illustrates a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

Figure 7:
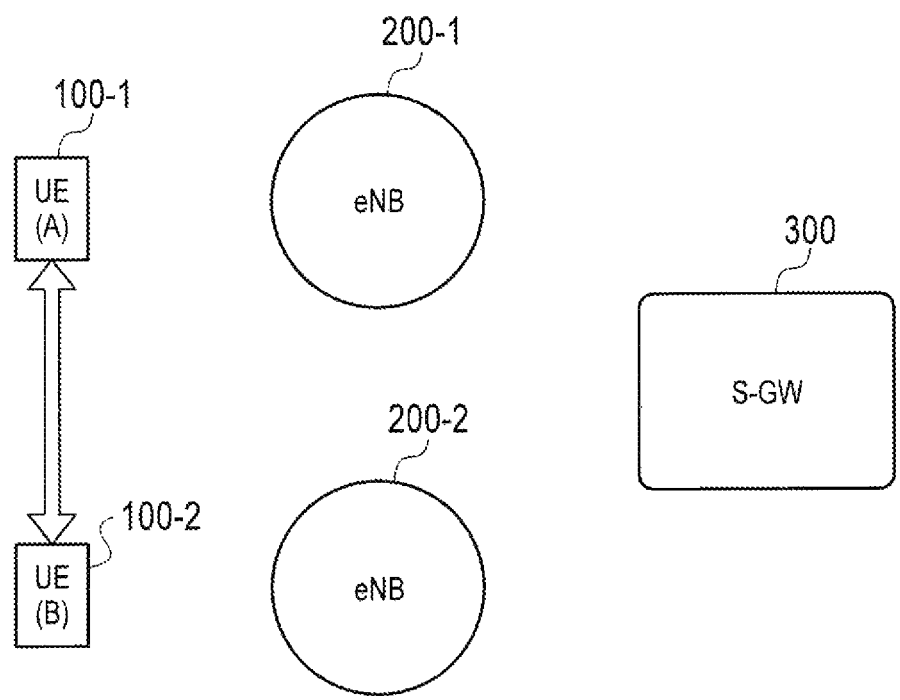
FIG. 7 illustrates a data path in D2D communication.

FIG. 7 illustrates a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2. In this case, the UE 100-1 and the UE 100-2 constitute a D2D group.

For example, one UE 100 of the UE 100-1 and the UE 100-2 discovers the other UE 100 existing in the vicinity of the one UE 100, so that the D2D communication starts. It is noted that in order to start the D2D communication, the UE 100 has a (Discover) function of discovering the other UE 100 existing in the vicinity of the UE 100. Furthermore, the UE 100 has a (Discoverable) function discovered by the other UE 100.

As illustrated in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example. It is noted that in a mode called Locally Routed, a data path passes through the eNB 200 without passing through the S-GW 300.

Furthermore, the D2D communication is considered to be performed in a frequency band of the LTE system, and for example, in order to avoid interference to the cellular communication, the D2D communication is performed under the control of the network (eNB 200). A radio resource assignment scheme for the D2D communication mainly includes the following two schemes.

According to the first assignment scheme, the UE 100 is able to select a radio resource to be used in the D2D communication. Specifically, the eNB 200 transmits, to the UE 100, information indicating candidate assigned radio resources that are radio resources available for the D2D communication. The UE 100 autonomously selects a radio resource to be used in the D2D communication from the candidate assigned radio resources.

According to the second assignment scheme, the eNB 200 determines a radio resource to be used in the D2D communication. That is, the UE 100 has no selection right of the radio resource to be used in the D2D communication. Specifically, the eNB 200 transmits, to the UE 100, information indicating a radio resource dynamically or quasi-statically assigned for the D2D communication. The UE 100 performs the D2D communication by using the assigned radio resource.

(Discovery-Use Signal)

Before starting D2D communication, the UE 100 transmits a Discovery signal for discovering another UE 100 existing in the vicinity of the UE 100. The Discovery signal, in the present embodiment, corresponds to a discovery-use signal used for discovering a communication partner terminal in the D2D communication.

FIG. 8 is a diagram for explaining the Discovery signal. As illustrated in FIG. 8, UE 100-1 searching for UE 100-2 existing in the vicinity of the UE 100-1 periodically transmits a Discovery signal. The UE 100-2 periodically attempts to receive the Discovery signal.

When the Discovery signal is received from the UE 100-1, the UE 100-2 transmits a response signal for the Discovery signal to the UE 100-1. Furthermore, since the transmission of the response signal (a Discovery response signal) is not essential, it may be omitted.

Then, the UE 100-1 and/or the UE 100-2 transmit(s) a D2D communication request for starting the D2D communication to the eNB 200. As a consequence, the D2D communication is started under the control of the eNB 200. Alternatively, the UE 100-1 and/or the UE 100-2 may report Discovery information to the eNB 200 instead of the D2D communication request, and the eNB 200 may determine and control the start of the D2D communication.

In addition, the Discovery signal is transmitted within a frequency band assigned to the mobile communication system. The Discovery signal may be transmitted using a radio resource available in the D2D communication within the frequency band assigned to the mobile communication system. Alternatively, the Discovery signal may be transmitted using a designated radio resource for Discovery.

Figure 9:
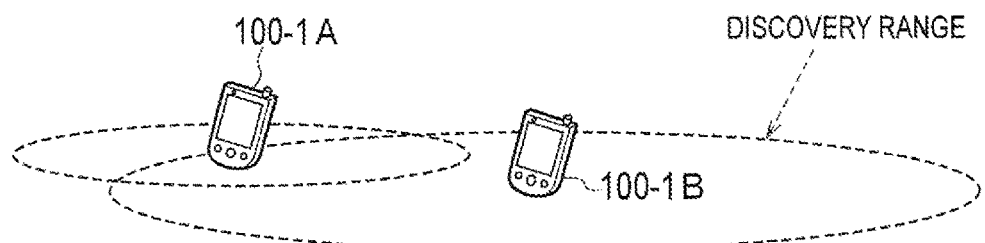
FIG. 9 is a diagram for explaining a reachable range of the Discovery signal (part 1).
Figure 10:
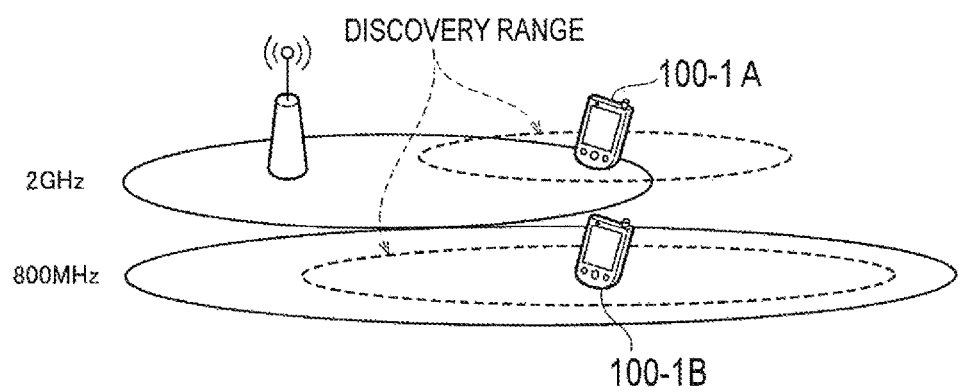
FIG. 10 is a diagram for explaining a reachable range of the Discovery signal (part 2).

FIG. 9 and FIG. 10 are diagrams for explaining a reachable range of the Discovery signal.

As illustrated in FIG. 9, the reachable range (a Discovery range) of the Discovery signal is determined on the basis of the transmission power of the Discovery signal. Accordingly, when the UE 100 transmits the Discovery signal with arbitrary transmission power, the Discovery range is irregular. As a consequence, there is a problem that the establishment and maintenance of D2D communication become difficult, or interference is given to cellular communication.

In order to solve such a problem, it is considered to uniformly set in advance appropriate transmission power of the Discovery signal in all UEs 100. However, in such a method, it is not possible to always appropriately set the transmission power of the Discovery signal depending on the situation of the UE 100, the situation of a cell where the UE 100 is located, and the like.

For example, as illustrated in FIG. 10, when comparing the case in which the Discovery signal is transmitted in a 2 GHz band in a cell operated in the 2 GHz band with the case in which the Discovery signal is transmitted in an 800 MHz band in a cell operated in the 800 MHz band, even though the Discovery signal is transmitted with the same transmission power, the Discovery signal reaches a long distance in the case of the 800 MHz band.

Consequently, according to the method in which the transmission power of the Discovery signal is uniformly set in advance in all the UEs 100, since the Discovery range may be inappropriate, it is probable that the establishment and maintenance of D2D communication become difficult, or interference is given to cellular communication.

Operation According to First Embodiment

The eNB 200 according to the present embodiment transmits the power control information for designating the transmission power of the Discovery signal to the UE 100. Thereby, the eNB 200 is able to designate the transmission power of the Discovery signal in the UE 100, so that the UE 100 is able to transmit the Discovery signal with appropriate transmission power.

Hereinafter, the operation according to the present embodiment will be described in the sequence of operation patterns 1 to 4.

(1) Operation Pattern 1

Figure 11:
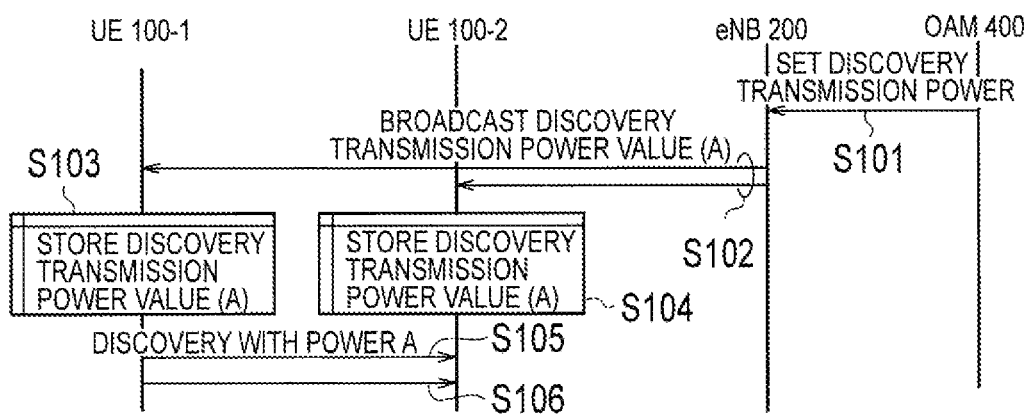
FIG. 11 is a sequence diagram of an operation pattern 1 according to a first embodiment.

FIG. 11 is a sequence diagram of the operation pattern 1 according to the present embodiment. The present operation pattern is a pattern in which the eNB 200 transmits the power control information in a broadcast manner.

As illustrated in FIG. 11, in step S101, the OAM 400 transmits information on optimal transmission power of the Discovery signal in each cell to the eNB 200. The optimal transmission power of the Discovery signal in each cell is determined on the basis of the frequency band of a cell and the size of the cell. On the basis of the information received from the OAM 400, the eNB 200 sets optimal transmission power of the Discovery signal in each cell of the eNB 200.

In step S102, on the basis of the setting in step S101, the eNB 200 transmits the power control information of the Discovery signal in a broadcast manner. For example, the power control information is included in system information block (SIB). The power control information is included in the system information block (SIB), so that the UE 100-1 is able to receive the power control information even in an idle state.

The power control information includes information indicating: an absolute value of the transmission power of the Discovery signal; and/or an acceptable range of the transmission power of the Discovery signal. The "acceptable range" may include an upper limit and a lower limit (that is, a relative value) that are determined using an absolute value of the transmission power as a reference, or may include an absolute value of the upper limit and the lower limit.

Hereinafter, the following description will be mainly provided for the case in which the power control information includes the absolute value of the transmission power of the Discovery signal. Furthermore, the absolute value of the transmission power of the Discovery signal will be referred to as a "Discovery transmission power value".

Moreover, the power control information is set in each cell. For example, power control information different in each cell may be transmitted, or power control information including Discovery transmission power values different in each cell may also be transmitted. Furthermore, it may be possible to transmit designation (setting) information indicating which is used, Equation 1 or Equation 2 described later.

In step S103, the UE 100-1 receives the power control information from the eNB 200, and stores the Discovery transmission power value (and the acceptable range) included in the received power control information. When the power control information includes a plurality of Discovery transmission power values (and acceptable ranges), the UE 100-1 stores a Discovery transmission power value (and an acceptable range) corresponding to a cell accommodating the UE 100-1.

In the same manner, in step S104, the UE 100-2 receives the power control information from the eNB 200, and stores the Discovery transmission power value (and the acceptable range) included in the received power control information.

In step S105 and step S106, the UE 100-1 periodically transmits the Discovery signal by using the Discovery transmission power value stored in step S103. That is, the UE 100-1 transmits the Discovery signal with transmission power that is determined by the Equation 1 below.

$$P_{Discovery,c}(i) = P_{D,c}(i) \text{ [dBm]} \quad \text{[Equation 1]}$$

where
$P_{Discovery,c}(i)$ denotes Discovery transmission power; and
$P_{D,c}(i)$ denotes designated Discovery transmission power.
(1)

Alternatively, when propagation loss (path loss) between the UE 100-1 and the eNB 200 or propagation loss between the UE 100-1 and the UE 100-2 has been well known, the UE 100-1 may correct and use the Discovery transmission power value stored in step S103 within the acceptable range on the basis of the propagation loss. For example, the UE 100-1 is able to receive broadcast information and a reference signal, which are transmitted from the eNB 200, and to estimate propagation loss from transmission power of the reference signal indicated by the received broadcast information and received power (RSRP) of the received reference signal. In the case of correcting the Discovery transmission power value on the basis of the propagation loss, the UE 100-1 transmits the Discovery signal with transmission power that is determined by the Equation 2 below.

$$P_{Discovery,c}(i) = 10 \log_{10}(P_{D,c}(i) - \alpha_c(i) \cdot PL_c) \text{ [dBm]} \quad \text{[Equation 2]}$$

where
$\alpha_c(i)$ denotes a weighted coefficient; and
$PL_c$ denotes propagation loss.
(2)

As described above, the Discovery transmission power value is corrected such that the transmission power of the Discovery signal is reduced as the propagation loss is reduced, so that it is possible to reduce interference to the eNB 200 and another UE. On the other hand, the Discovery transmission power value is corrected such that the transmission power of the Discovery signal is increased as the propagation loss is increased, so that it is possible to expand the Discovery range in a range in which significant interference is not given to the eNB 200.

(2) Operation Pattern 2

Figure 12:
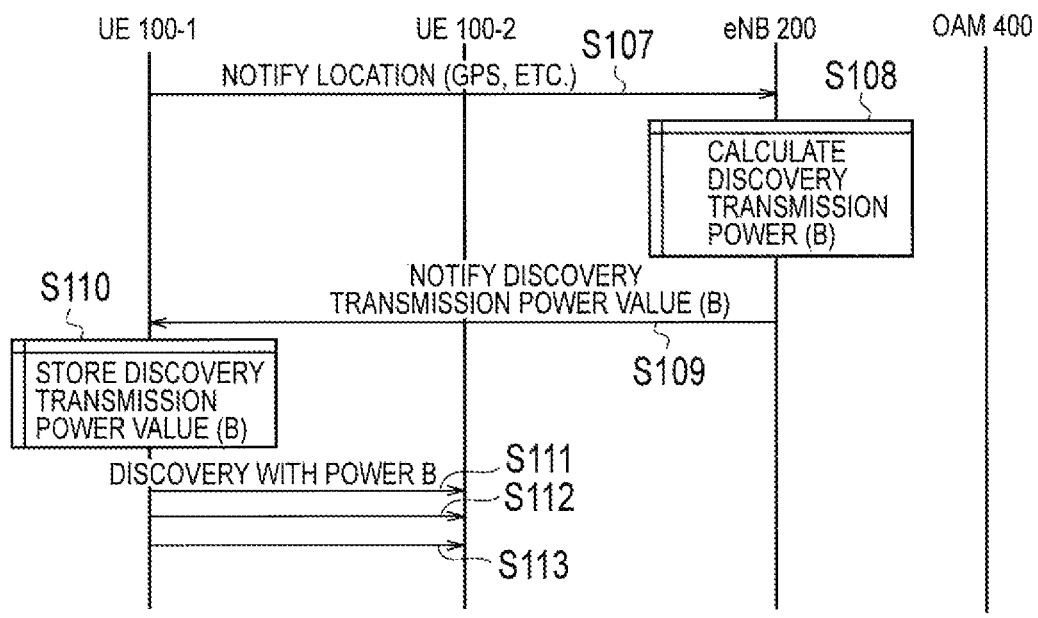
FIG. 12 is a sequence diagram of an operation pattern 2 according to the first embodiment.

FIG. 12 is a sequence diagram of the operation pattern according to the present embodiment. The present operation pattern is a pattern in which the eNB 200 transmits the power control information in a unicast manner. In the present operation pattern, the UE 100-1 is in a connected state.

In step S107, the UE 100-1 notifies the eNB 200 of location information indicating the location of the UE 100-1. However, in addition to the location information or instead of the location information, the UE 100-1 may notify the eNB 200 of capability information indicating the capability of the UE 100-1. Alternatively, as well as the case of notifying these types of information, the UE 100-1 may notify the eNB 200 of the fact that transmission of the Discovery signal is started. In addition, the capability of the UE 100-1, for example, includes a frequency band that is supported, Discovery capability or Discoverable capability, and resource scheduling capability.

In step S108, in response to the notification from the UE 100-1, the eNB 200 determines the Discovery transmission power value. Specifically, on the basis of: the location or capability of the UE 100-1 and/or propagation loss between the eNB 200 and the UE 100-1, the eNB 200 determines the transmission power of the Discovery signal in the UE 100-1.

In the case of determining the Discovery transmission power value on the basis of the location or the propagation loss, it is possible to apply a method for correcting a transmission power value serving as a reference on the basis of the propagation loss similarly to the Equation 2 above. Here, when transmission power notified from the UE 100-1 has been well known, it is possible to estimate the propagation loss from the difference between the transmission power and the notified received power. Alternatively, the propagation loss may be estimated on the basis of SRS or DMRS that is transmitted from the UE 100-1. Furthermore, it is possible to obtain a distance between the UE 100-1 and the eNB 200 from the location of the UE 100-1, and to estimate the propagation loss from the distance.

The first method is a method for determining the transmission power of the Discovery signal depending on each frequency band that is supported (for example, 0 dBm: 800 MHz, and 6 dBm: 2 GHz, respectively).

The second method is a method for determining the transmission power of the Discovery signal by the Discovery capability or the Discoverable capability. For example, in the UE 100-1, a valid power value is set when a D2D function (a Discovery function, a Discoverable function, and a Communication function) is ON, and an invalid power value (0 [mW] and the like) is set when the D2D function is OFF. Alternatively, large power is set when a Discovery or Discoverable range is "Wide", middle power is set when the Discovery or Discoverable range is "Middle", and small power is set when the Discovery or Discoverable range is "Narrow".

The third method is a method for determining the transmission power of the Discovery signal by the resource scheduling capability. Specifically, the resource scheduling capability (a resource scheduling function) indicates capability by which a radio resource in the D2D communication is controlled at the initiative of UE. When the resource scheduling function is ON (that is, when the radio resource is controlled at the initiative of UE), since it is distributed scheduling, the small power is set such that Discovery (D2D communication) is performed in a minimum range, in order to reduce influence between UEs or influence to eNB in the first place. On the other hand, when the resource scheduling function is OFF (that is, when the radio resource is controlled at the initiative of eNB), the Discovery is performed in a maximum range, and the large power is set such that the eNB performs interference control in data communication.

Furthermore, in the case of determining the Discovery transmission power value on the basis of the capability of the UE 100-1, the following first to third methods are applicable.

In step S109, the eNB 200 transmits power control information including the Discovery transmission power value determined in step S108 to the UE 100-1 in a unicast manner. For example, the eNB 200 allows the power control information to be included in an RRC message or downlink control information (DCI), and transmits the RRC message or the downlink control information to the UE 100-1. Furthermore, it may be possible to transmit designation (setting) information indicating which is used, the above-described Equation 1 or Equation 2.

The power control information includes information indicating: an absolute value (the Discovery transmission power value) of the transmission power of the Discovery signal, and/or an acceptable range of the transmission power of the Discovery signal. The "acceptable range" may include an upper limit and a lower limit (that is, a relative value) that are determined using an absolute value of the transmission power as a reference, or may include an absolute value of the upper limit and the lower limit.

Hereinafter, the following description will be mainly provided for the case in which the power control information includes the absolute value of the transmission power of the Discovery signal.

Furthermore, as well as the case in which the power control information is set in each UE 100, the power control information may be set in each D2D group. In this case, the eNB 200 further transmits the power control information, which is to be transmitted to the UE 100-1, to another UE belonging to the same D2D group as that of the UE 100-1. In addition, the D2D group includes the case in which UEs physically in a remote place are grouped as "friends" or the case in which UEs in a certain shop are grouped, as well as the case in which UEs that perform (will perform) D2D communication are grouped.

Alternatively, the power control information may be set in each location. In this case, the eNB 200 further transmits the power control information, which is to be transmitted to the UE 100-1, to another UE located in the vicinity of the UE 100-1.

In step S110, the UE 100-1 receives the power control information from the eNB 200, and stores the Discovery transmission power value (and the acceptable range) included in the received power control information.

In step S111 to step S113, on the basis of the Discovery transmission power value (and the acceptable range) stored in step S110, the UE 100-1 periodically transmits the Discovery signal with the transmission power calculated by the Equation 1 or the Equation 2 above.

In addition, in the case of performing handover of the UE 100-1 to another eNB, it is preferable that the eNB 200 notifies the other eNB of the Discovery transmission power value determined in step S108 through the X2 interface or the S1 interface. For example, the Discovery transmission power value is included in a handover request that is transmitted to the other eNB on the X2 interface or the S1 interface, so that the other eNB is able to take over the setting of the transmission power of the Discovery signal.

(3) Operation Pattern 3

Figure 13:
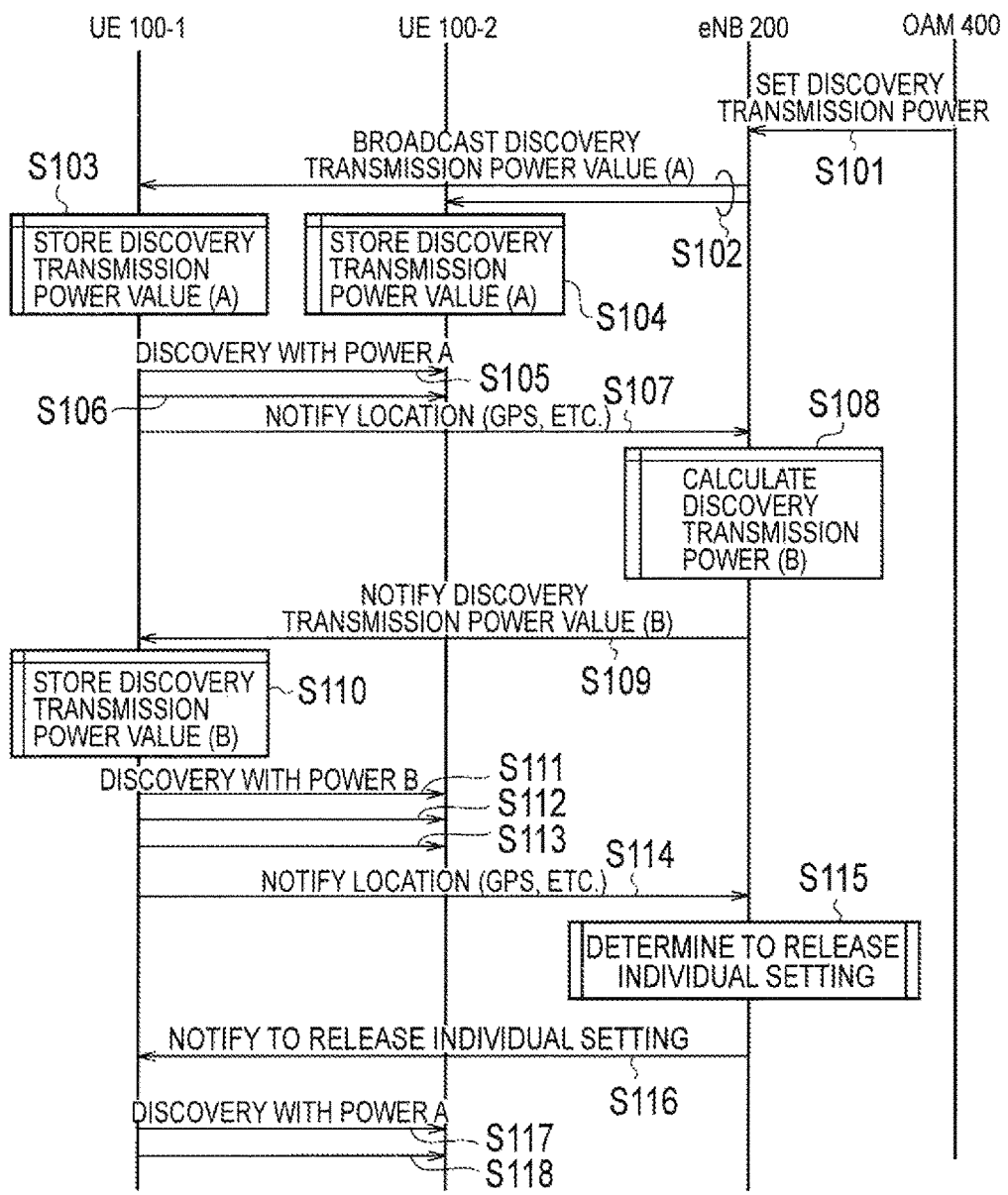
FIG. 13 is a sequence diagram of an operation pattern 3 according to the first embodiment.

FIG. 13 is a sequence diagram of the operation pattern according to the present embodiment. The present operation pattern is a pattern in which the eNB 200 uses both broadcast transmission and unicast transmission of the power control information. In the present operation pattern, power control information transmitted in a unicast manner is applied preferentially over power control information transmitted in a broadcast manner.

As illustrated in FIG. 13, steps S101 to S106 are equal to the aforementioned operation pattern 1.

Steps S107 to S113 are equal to the aforementioned operation pattern 2. As described above, even in the case in which the UE 100-1 has received and stored a Discovery transmission power value A (and an acceptable range) transmitted in a broadcast manner, when the UE 100-1 received and stored a Discovery transmission power value B (and an acceptable range) transmitted in a unicast manner, the UE 100-1 applies the Discovery transmission power value B (and the acceptable range). This is because the accuracy of the Discovery transmission power value B (and the acceptable range) transmitted in a unicast manner is higher than that of the Discovery transmission power value A (and the acceptable range) transmitted in a broadcast manner.

In step S114, the UE 100-1 notifies the eNB 200 of location information indicating the location of the UE 100-1. However, in addition to the location information or instead of the location information, the UE 100-1 may notify the eNB 200 of capability information indicating the capability of the UE 100-1. Alternatively, as well as the case of notifying these types of information, the UE 100-1 may notify the eNB 200 of the fact that transmission of the Discovery signal is started.

In step S115, on the basis of the notification from the UE 100-1, the eNB 200 determines whether to release the Discovery transmission power value B (that is, Discovery transmission power individual setting) determined in step S108. For example, in the following cases, the eNB 200 determines to release the Discovery transmission power individual setting.

- Since UE location is changed, the range of unicast setting is exceeded.
- Since UE capability (for example, Discoverable capability) is changed, the necessity of unicast setting is removed (broadcast setting is sufficient).
- Due to the number of UEs in the cell of the eNB 200 (including D2D communication and cellular communication), traffic and the like, the necessity of unicast setting is removed (broadcast setting is sufficient).

Hereinafter, the following description will be given on the assumption that the eNB 200 determines to release the Discovery transmission power individual setting.

In step S116, the eNB 200 notifies the UE 100-1 of the release of the Discovery transmission power individual setting. When the notification is received, the UE 100-1 stops the application of the Discovery transmission power value B (and the acceptable range) stored in step S110. In addition, as well as the case of performing the release notification in a unicast manner, individual setting of all UEs in the cell of the eNB 200 may be released in a broadcast manner.

In steps S117 and S118, on the basis of the Discovery transmission power value (and the acceptable range) stored in step S103, the UE 100-1 periodically transmits the Discovery signal with the transmission power calculated by the Equation 1 or the Equation 2 above.

(4) Operation Pattern 4

The present operation pattern is common with the operation pattern 3 in that it is a pattern in which the eNB 200 uses both the broadcast transmission and the unicast transmission of the power control information.

However, the present operation pattern is different from the operation pattern 3 in that when the UE 100-1 received power control information transmitted in a broadcast manner and power control information transmitted in a unicast manner, the UE 100-1 is able to select one power control information.

Specifically, the eNB 200 gives an instruction of one of the power control information transmitted in a broadcast manner and the power control information transmitted in a unicast manner, which is to be preferentially applied, to the UE 100-1. The UE 100-1 selects and applies one of the two types of power control information according to the instruction from the eNB 200.

Summary of First Embodiment

The eNB 200 according to the present embodiment transmits the power control information for designating the transmission power of the Discovery signal to the UE 100. Thereby, the eNB 200 is able to designate the transmission power of the Discovery signal in the UE 100, so that the UE 100 is able to transmit the Discovery signal with appropriate transmission power.

In the present embodiment, the power control information includes information indicating: an absolute value of the transmission power and/or an acceptable range of the transmission power. Thereby, since it is sufficient if the UE 100 transmits the Discovery signal with the transmission power according to the power control information, it is possible to reduce a processing load for determining the transmission power.

In the present embodiment, in the case of transmitting the power control information in a broadcast manner, the power control information is set in each cell. Thereby, it is possible to allow the transmission power of the Discovery signal to be adaptive to characteristics (a frequency band, a size and the like) of a cell.

In the present embodiment, in the case of transmitting the power control information in a unicast manner, the power control information is set in each UE 100, each D2D group, or each location. Thereby, it is possible to finely set the transmission power of the Discovery signal.

In the present embodiment, in the case of transmitting the power control information in a unicast manner, the eNB 200 determines the transmission power of the Discovery signal in the UE 100 on the basis of: the location or capability of the UE 100 and/or propagation loss between the eNB 200 and the UE 100. Thereby, it is possible to allow the transmission power of the Discovery signal to be adaptive to the situation of the UE 100.

In the present embodiment, in the case of performing handover of the UE 100 to another eNB, the eNB 200 notifies the other eNB of the determined transmission power. Thereby, eNB serving as a handover destination is able to take over setting of the transmission power of the Discovery signal.

Second Embodiment

Hereinafter, the second embodiment will be described while focusing on the differences from the first embodiment.

Operation According to Second Embodiment

The UE 100 according to the present embodiment determines the transmission power of the Discovery signal, and then transmits inquiry information for inquiring whether to apply the determined transmission power to the eNB 200.

Hereinafter, the operation according to the present embodiment will be described in the sequence of operation patterns 1 and 2.

(1) Operation Pattern 1

Figure 14:
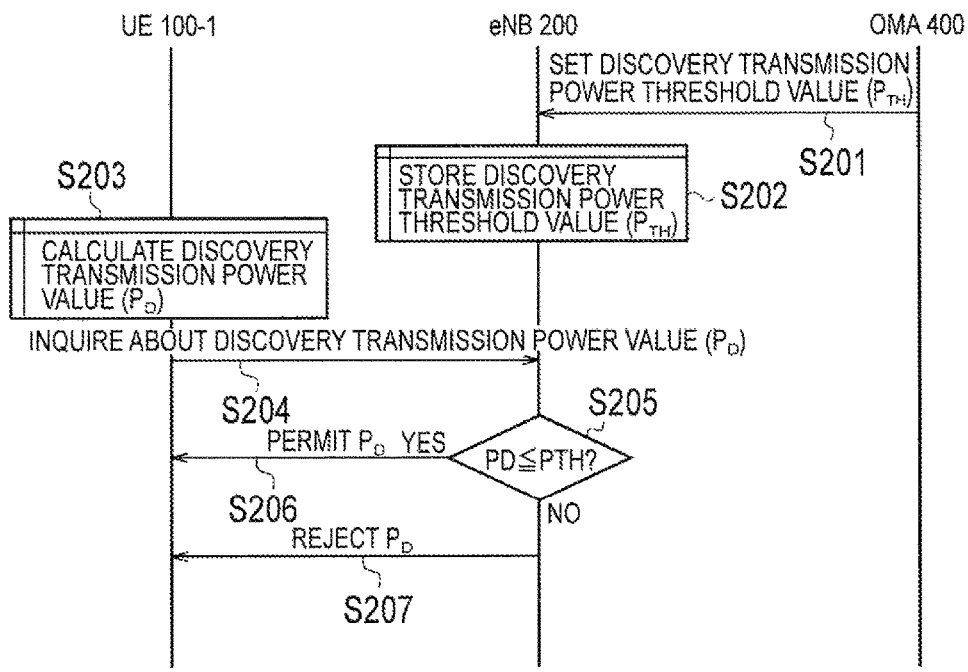
FIG. 14 is a sequence diagram of an operation pattern 1 according to a second embodiment.

FIG. 14 is a sequence diagram of the operation pattern 1 according to the present embodiment.

As illustrated in FIG. 14, in step S201, the OAM 400 transmits information on a threshold value (hereinafter, a "Discovery transmission power threshold value") of the transmission power of the Discovery signal to the eNB 200. The Discovery transmission power threshold value is determined on the basis of an installation environment of the eNB 200. For example, when the installation environment is a HetNet environment in which a pico eNB (PeNB) or a home eNB (HeNB) is installed adjacent to the eNB 200, it is preferable to allow the Discovery transmission power threshold value to be smaller than usual in order to reduce interference to the PeNB or the HeNB.

In step S202, on the basis of the information received from the OAM 400, the eNB 200 stores (sets) the Discovery transmission power threshold value.

In step S203, the UE 100-1 determines (calculates) a Discovery transmission power value. For example, similarly to the first embodiment, the UE 100-1 determines the Discovery transmission power value on the basis of: the location or capability of the UE 100 and/or propagation loss between the eNB 200 and the UE 100.

Alternatively, the UE 100-1 may determine the Discovery transmission power value by applying a calculation equation of SRS transmission power. In this way, the UE 100-1 determines the Discovery transmission power value by Equation 3 below.

$$P_{Discovery,c}(i) = \min\{P_{CMAX,c}(i), P_{Discovery\_OFFSET,c} + 10\log_{10}(M_{Discovery,c}) + P_{O\_PUSCH,c}(j) + \alpha_c(j) \cdot PL_c + f_c(i)\} \text{ [dBm]} \quad \text{[Equation 3]}$$

where $P_{CMAX,c}(i)$ denotes a UE transmission power maximum value;

$P_{Discovery\_OFFSET,c}(m)$ denotes an offset value for Discovery transmission power with respect to $P_{O\_PUSCH,c}(j)$;

$M_{SRS,c}$ denotes a transmission bandwidth of a Discovery signal (the number of resource blocks);

$P_{O\_PUSCH,c}(j)$ denotes the sum of Nominal transmission power values that are set by an upper layer; and $f_c(i)$ denotes a PUSCH power control adjustment value. (3)

In addition, information on the offset value for Discovery transmission power is transmitted in advance from the eNB 200 to the UE 100-1.

In step S204, the UE 100-1 transmits, to the eNB 200, inquiry information for inquiring whether to apply the Discovery transmission power value determined in step S203. The inquiry information includes information indicating the Discovery transmission power value determined by the UE 100.

In step S205, the eNB 200 determines whether the Discovery transmission power value indicated by the inquiry information received from the UE 100 in step S204 is equal to or less than the Discovery transmission power threshold value stored in step S202.

When a result of the determination in step S205 is "Yes", the eNB 200 notifies the UE 100-1 of the fact that the Discovery transmission power value determined by the UE 100 is permitted, in step S206.

On the other hand, when a result of the determination in step S205 is "No", the eNB 200 notifies the UE 100-1 of the fact that the Discovery transmission power value determined by the UE 100 is rejected, in step S207.

(2) Operation Pattern 2

Figure 15:
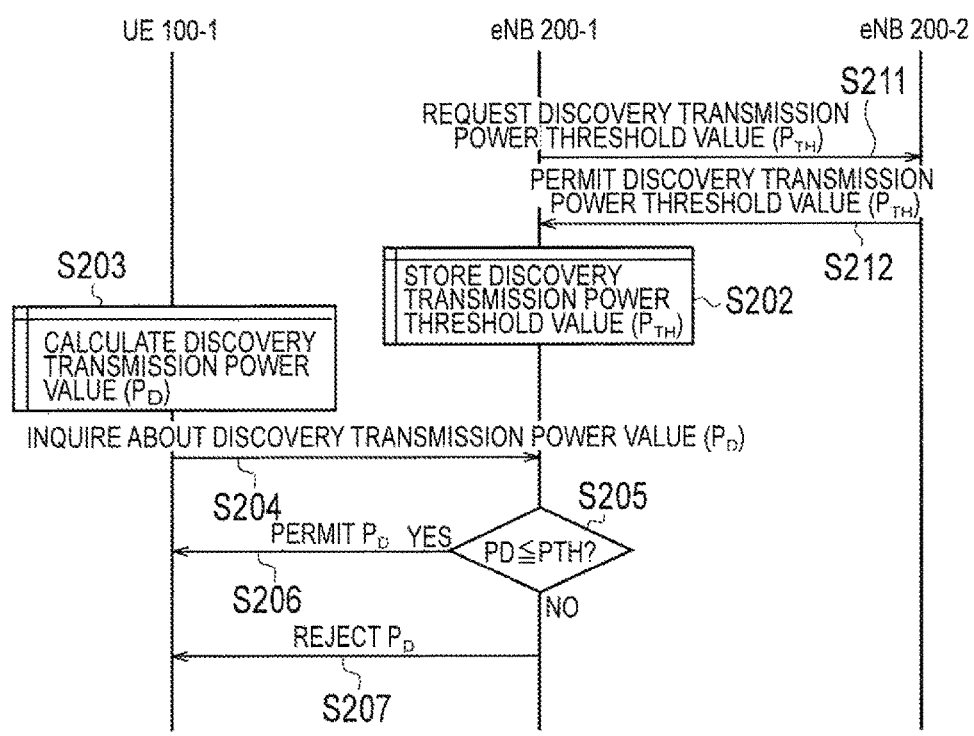
FIG. 15 is a sequence diagram of an operation pattern 2 according to the second embodiment.

FIG. 15 is a sequence diagram of the operation pattern according to the present embodiment. Hereinafter, differences from the operation pattern 1 according to the present embodiment will be mainly described. The present operation pattern is different from the operation pattern 1 in that the Discovery transmission power threshold value is determined by negotiation with the neighboring eNB.

As illustrated in FIG. 15, in step S211, the eNB 200-1 inquires of the eNB 200-2 adjacent to the eNB 200-1 about whether to apply the Discovery transmission power threshold value through the X2 interface or the S1 interface. For example, the Discovery transmission power threshold value (an initial value) is a preset value directed to macro eNB.

In step S212, the eNB 200-2 determines whether to permit the Discovery transmission power threshold value notified from the eNB 200-1 in step S211. For example, when the eNB 200-2 is a pico eNB, the eNB 200-2 determines to reject the Discovery transmission power threshold value notified from the eNB 200-1. Hereinafter, the following description will be given on the assumption that the eNB 200-2 determines to permit the Discovery transmission power threshold value. The eNB 200-2 notifies the eNB 200-1 of the fact that the Discovery transmission power threshold value is permitted through the X2 interface or the S1 interface.

In step S202, in response to the permission of the Discovery transmission power threshold value by the eNB 200-2, the eNB 200-1 stores (sets) the Discovery transmission power threshold value. In addition, subsequent operations are equal to those of the operation pattern 1 according to the present embodiment.

In addition, when the eNB 200-2 determines to reject the Discovery transmission power threshold value, the eNB 200-1 inquires again of the eNB 200-2 about whether to apply the Discovery transmission power threshold value, on the basis of a calculation equation, a preset value, or setting for PeNB that is set from an upper device. Thereby, it is possible to autonomously set the Discovery transmission power threshold value.

Summary of Second Embodiment

The UE 100 according to the present embodiment determines the transmission power of the Discovery signal, and then transmits inquiry information for inquiring whether to apply the determined transmission power to the eNB 200. Thereby, the eNB 200 is able to manage the transmission power of the Discovery signal in the UE 100, so that the UE 100 is able to transmit the Discovery signal with appropriate transmission power.

In the present embodiment, the inquiry information includes information indicating the transmission power of the Discovery signal determined by the UE 100. Thereby, the eNB 200 is able to determine whether the transmission power of the Discovery signal determined in the UE 100 is permissible.

In the present embodiment, the UE 100 determines the transmission power of the Discovery signal on the basis of: the location or capability of the UE 100 and/or propagation loss between the eNB 200 and the UE 100. Thereby, it is possible to allow the transmission power of the Discovery signal to be adaptive to the situation of the UE 100.

Other Embodiments

Thus, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

For example, it may be possible to perform a combination of the first embodiment (the initiative of a base station) and the second embodiment (the initiative of a terminal). FIG. 16 is a sequence diagram of an operation pattern according to another embodiment. Hereinafter, differences from the first embodiment and the second embodiment will be mainly described.

As illustrated in FIG. 16, in step S301, the OAM 400 transmits information on the transmission power of the Discovery signal to the eNB 200.

In step S302, on the basis of the setting in step S301, the eNB 200 transmits power control information of the Discovery signal in a broadcast manner.

In step S303, the UE 100-1 receives the power control information from the eNB 200, and stores a Discovery transmission power value included in the received power control information.

In the same manner, in step S304, the UE 100-2 receives the power control information from the eNB 200, and stores the Discovery transmission power value included in the received power control information.

In steps S305 and S306, the UE 100-1 periodically transmits the Discovery signal by using the Discovery transmission power value stored in step S303, that is, with the transmission power determined by the Equation 1 above.

In step S307, the eNB 200 transmits a reference signal (CRS).

In step S308, on the basis of the reference signal (CRS) from the eNB 200, the UE 100-1 estimates the location thereof, or propagation loss between the UE 100-1 and the eNB 200.

In step S309, on the basis of the location or the propagation loss estimated in step S308, the UE 100-1 calculates a Discovery transmission power value by the Equation 2 above.

In step S310, the UE 100-1 transmits, to the eNB 200, inquiry information for inquiring whether to apply the Discovery transmission power value determined (calculated) in step S309. The inquiry information includes information indicating the Discovery transmission power value determined by the UE 100.

In step S311, the eNB 200 determines whether to permit the Discovery transmission power value notified from the UE 100-1 in step S310. Hereinafter, the following description will be given on the assumption that the eNB 200 determines to permit the Discovery transmission power value.

In step S312, the eNB 200 notifies the UE 100-1 of the fact that the Discovery transmission power value is permitted.

In steps S313 to S315, the UE 100-1 periodically transmits the Discovery signal by using the Discovery transmission power value determined in step S309.

In step S316, the eNB 200 determines whether to release the Discovery transmission power value B (that is, Discovery transmission power individual setting) permitted in step S312. For example, due to the reduction of the number of UEs in the cell of the eNB 200 (including D2D communication and cellular communication), when it is determined that the necessity of unicast setting (fine setting) is removed, the eNB 200 determines to release the Discovery transmission power individual setting. Hereinafter, the following description will be given on the assumption that the eNB 200 determines to release the Discovery transmission power individual setting.

In step S317, the eNB 200 notifies the UE 100-1 of the release of the Discovery transmission power individual setting. In addition, as well as the case of performing the release notification in a unicast manner, individual setting of all UEs in the cell of the eNB 200 may be released in a broadcast manner. When the notification is received, the UE 100-1 stops applying the Discovery transmission power value B determined in step S309.

In steps S318 and S319, the UE 100-1 periodically transmits the Discovery signal by using the Discovery transmission power value stored in step S303.

In the above embodiment, as one example of a mobile communication system, the LTE system is explained. However, the present invention is not limited to the LTE system, and the present invention may be applied to systems other than the LTE system.

In addition, the entire content of U.S. Provisional Application No. 61/694,052 (filed on Aug. 28, 2012) is incorporated in the present specification by reference.

INDUSTRIAL APPLICABILITY

As described above, the base station, the user terminal and the processor according to the present invention is able to appropriately control the D2D communication, and thus is useful in a mobile communication field.

The invention claimed is:
1. A user terminal comprising:
a controller configured to
receive a system information block (SIB) broadcasted by a base station, the SIB including first information for determining transmission power of a discovery signal to be transmitted from the user terminal to another user terminal, wherein the first information includes information indicating an acceptable range of the transmission power of the discovery signal,
calculate a path loss based on a reference signal transmitted by the base station,
in an idle state, determine the transmission power based on the first information and the path loss, and
in the idle state, transmit the discovery signal by the determined transmission power,
wherein the discovery signal is a signal transmitted for discovering other user terminal existing in proximity of the user terminal, and
the idle state is a state in which a radio resource control (RRC) connection is not established between the user terminal and the base station.
2. The user terminal according to claim 1, wherein
the controller is configured to
receive second information individually transmitted from the base station to the user terminal, after receiving the SIB, wherein the second information is information for determining the transmission power,
determine the transmission power based on the second information and the path loss, and transmit the discovery signal by the determined transmission power.

3. The user terminal according to claim 1, wherein
the first information includes information indicating maximum transmission power of the discovery signal, and
the controller is configured to determine the transmission power, based on the first information and the path loss, within the limits of the maximum transmission power.

4. A base station comprising:
a controller configured to broadcast a system information block (SIB) including first information for determining transmission power of a discovery signal to be transmitted from a user terminal to another user terminal, wherein the first information includes information indicating an acceptable range of the transmission power of the discovery signal,
wherein the first information is used by the user terminal along with a path loss to determine the transmission power,
the path loss is calculated by the user terminal based on a reference signal transmitted by the base station,
the discovery signal is a signal transmitted by the user terminal to discover other user terminal existing in proximity of the user terminal, in an idle state, and
the idle state is a state in which a radio resource control (RRC) connection is not established between the user terminal and the base station.

5. The base station according to claim 4, wherein
the controller is configured to individually transmit second information to the user terminal, after transmitting the SIB, and
the second information is used by the user terminal along with the path loss to determine the transmission power.

6. The base station according to claim 4, wherein
the first information includes information indicating maximum transmission power of the discovery signal.

7. A device for controlling a user terminal, comprising:
a processor configured to cause the user terminal to
receive a system information block (SIB) broadcasted by a base station, the SIB including first information for determining transmission power of a discovery signal to be transmitted from the user terminal to another user terminal, wherein the first information includes information indicating an acceptable range of the transmission power of the discovery signal,
calculate a path loss based on a reference signal transmitted by the base station,
in an idle state, determine the transmission power based on the first information and the path loss, and
in the idle state, transmit the discovery signal by the determined transmission power,
wherein the discovery signal is a signal transmitted for discovering other user terminal existing in proximity of the user terminal, and
the idle state is a state in which a radio resource control (RRC) connection is not established between the user terminal and the base station.

8. A device for controlling a base station, comprising:
a processor configured to cause the base station to broadcast a system information block (SIB) including first information for determining transmission power of a discovery signal to be transmitted from a user terminal to another user terminal, wherein the first information includes information indicating an acceptable range of the transmission power of the discovery signal,
wherein the first information is used by the user terminal along with a path loss to determine the transmission power,
the path loss is calculated by the user terminal based on a reference signal transmitted by the base station,
the discovery signal is a signal transmitted by the user terminal to discover other user terminal existing in proximity of the user terminal, in an idle state, and
the idle state is a state in which a radio resource control (RRC) connection is not established between the user terminal and the base station.

* * * * *